No. 755,479. Patented March 22, 1904.

UNITED STATES PATENT OFFICE.

ROBERT GOLDSCHMIDT, OF TAJKOVITZ, AND JAN HASEK, OF SMICHOV, AUSTRIA-HUNGARY.

MANUFACTURE OF STARCH.

SPECIFICATION forming part of Letters Patent No. 755,479, dated March 22, 1904.

Application filed April 11, 1903. Serial No. 152,252. (No specimens.)

*To all whom it may concern:*

Be it known that we, ROBERT GOLDSCHMIDT, a Belgian subject, residing at Tajkovitz, Moravia, and JAN HASEK, a subject of the Emperor of Austria-Hungary, residing at Smichov, Bohemia, Austria-Hungary, have invented a certain new and useful Process of Making Starch; and we hereby declare that the following is a full, clear, and exact description of the invention, which will enable others skilled in the art to which it appertains to make and use the same.

Heretofore in the manufacture of potato-starch the separation of the grindings into pulps and starch-milk has been performed in the apparatuses by repeated washing with water, and raw starch has been made by letting subside the starch, the particles of sand, and rougher particles of fibers. Therefore it is made by the separation of the heavier parts from the waste water in the sediment troughs or discharges and partly by the refining of the raw starch through single and repeated washings with water, followed by the subsiding of the starch-milk in the washing-troughs or in the washing-discharges. The unavoidable working of the wet starch, the latter resulting from said well-known proceedings, is a disagreeable burden of the whole manufacture of starch. At the same time the utilization of the residues—*i. e.*, of the pulp and the flowing-off water—is a tiresome operation, which does not pay at all.

In our new process we do without sieving apparatus, also without sedimentary and washing troughs and floods, and we reduce the quantity of water completely and do not need to work the wet starch. The waste or wash water and the pulp can be utilized more rationally. The whole manufacturing process is free from the tiresome flowing-off waters, and our new process allows a simple, sure, and cheap manner of working in combination with a proportionally high production of pure starch.

By our process the starch is obtained at practically a single comparatively dry operation directly from the ground raw potatoes. The washed potatoes, peeled and unpeeled, are ground without the addition of water or with the addition of a small quantity, enough to make a pulp, and the mass is treated with a mineral acid, such as sulfurous acid, or an alkali, such as soda-lye. The quantity of the acid or alkali depends on the nature of the potatoes. The main object of the addition thereof is to destroy the enzymes which produce fermentation or color in the liquid or starch, so that only pure starch will be obtained. The exact quantity is dependent on local conditions, and is therefore found out by experience or analysis. The potatoes thus ground and treated as above are passed directly from the grinding-machine into a centrifugal separator having a finely-perforated drum covered on the inside with cloth. When the machine is operated, the greater part of the liquid will escape through the cloth and drum without containing the slightest trace of starch. If the potatoes were peeled before grinding, practically only pure starch containing about thirty per cent. of water will remain in the drum. If the potatoes were not peeled, the ground peels will also remain in the machine. The comparatively solid mass which thus remains is then dried until it contains the usual quantity of water, about eighteen per cent., after which it is ground, and the separation of the starch from the fibers or peels is then accomplished by known shaking-separators.

We claim—

The process of producing starch from potatoes, consisting in grinding the potatoes to a pulp, treating the same with chemicals to prevent fermentation, separating the whole mass of the pulp directly, by centrifugal action, into its solid and liquid parts, drying and grinding the said solids, and separating the starch therefrom while dry.

In testimony whereof we affix our signatures in presence of two witnesses.

ROBERT GOLDSCHMIDT.
JAN HASEK.

Witnesses:
   LADISLAR VOJACEK,
   ADOLPH FISCHER.